United States Patent
Shobert et al.

[11] 3,864,182
[45] Feb. 4, 1975

[54] METHOD OF MAKING A REINFORCED PLASTIC APERTURED TUBE

[75] Inventors: Samuel M. Shobert, Mishawaka; Bernard L. Rice, Osceola, both of Ind.

[73] Assignee: Plas/Steel Products, Inc., Walkton, Ind.

[22] Filed: July 18, 1973

[21] Appl. No.: 380,489

[52] U.S. Cl.............. 156/175, 156/172, 156/180, 156/187, 156/190, 156/193, 156/232, 166/231, 166/233, 210/497.1, 264/139, 264/154
[51] Int. Cl..................... B31c 13/00, E03b 3/18
[58] Field of Search............ 156/143, 144, 153–155, 156/168, 173, 175, 187, 188, 189, 192, 193, 195, 232, 247, 255, 428, 429, 430, 434, 470, 472, 493, 500, 553, 172, 180; 264/139, 154, DIG. 70; 166/227, 231, 233, 236; 29/163.5; 210/490, 494, 496, 497.1, 498

[56] References Cited
UNITED STATES PATENTS

| | | | |
|---|---|---|---|
| 1,040,342 | 10/1912 | Johnson | 166/233 |
| 2,629,894 | 3/1953 | Boggs | 156/173 |
| 3,150,416 | 9/1964 | Such | 264/154 |
| 3,281,299 | 10/1966 | Shobert | 156/431 |
| 3,351,510 | 11/1967 | Harris | 156/232 |
| 3,378,420 | 4/1968 | Dickson et al. | 156/307 |
| 3,692,607 | 9/1972 | Shobert | 156/175 |
| 3,762,982 | 10/1973 | Whittington | 156/187 |

Primary Examiner—Clifton B. Cosby
Assistant Examiner—John E. Kittle

[57] ABSTRACT

A method of fabricating a reinforced plastic, apertured tube, such as a well screen, which includes the steps of providing an elongated strip of plastic material which will not bond to the plastic material from which the tube is formed, the strip having a base portion and an upstanding portion extending therefrom. The strip is wound on a mandrel with the base portion in engagement therewith and the upstanding portion forming a generally helical groove, and circumferentially spaced, longitudinally extending grooves are formed in the upstanding portion of the thus-wound strip. A multi-filament glass strand pre-wetted with heat-hardenable plastic material is wound in the helical groove and lengths of such strand are placed in the longitudinal grooves so as substantially to fill the helical and longitudinal grooves. The plastic material is then hardened while the strand and lengths are in the grooves and the strip is on the mandrel thereby to form a glass-reinforced plastic tube surrounding the base portion of the strip and with the upstanding portion of the strip embedded in the wall of the tube. The mandrel is then removed from the interior of the base portion of the wound strip and the strip is removed from the interior of the tube, removal of the upstanding portion of the strip from the wall of the tube leaving apertures therein.

11 Claims, 13 Drawing Figures

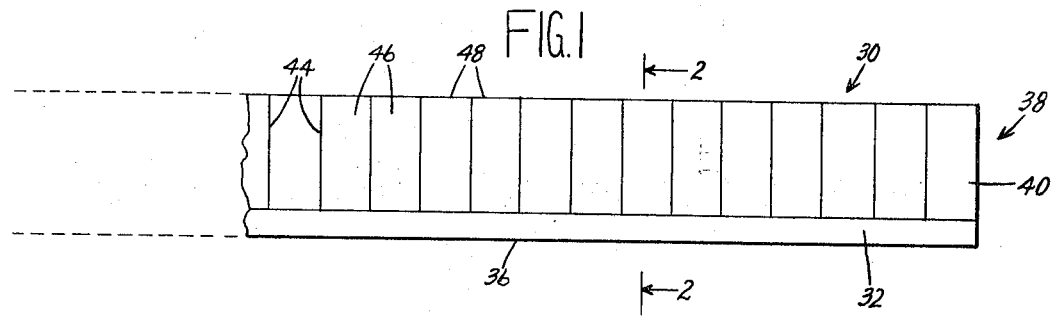
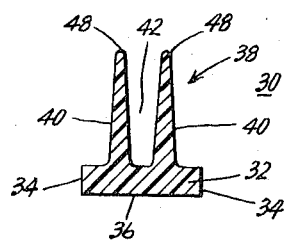
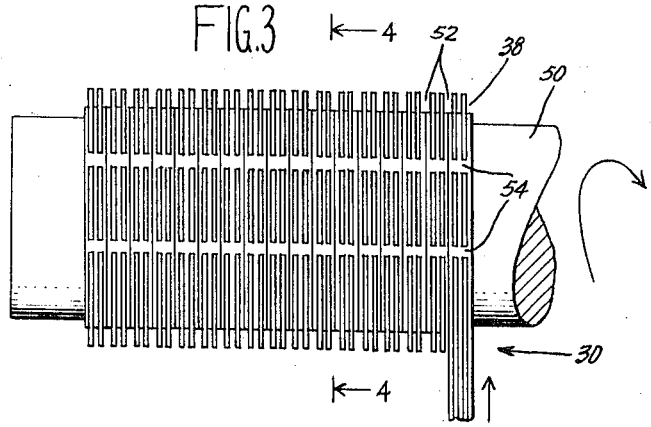
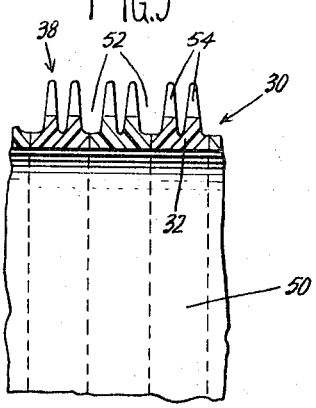

METHOD OF MAKING A REINFORCED PLASTIC APERTURED TUBE

BACKGROUND OF THE INVENTION

1. Field of the Invention

This invention relates generally to a method of fabricating a reinforced plastic, apertured tube, such as a well screen.

2. Description of the Prior Art

U.S. Pat. No. 3,692,607 to one of the present applicants, Samuel M. Shobert, discloses a reinforced plastic well screen and an apparatus and method for fabricating the same. In accordance with the method described and illustrated in that patent, a plurality of glass filaments are wetted with a liquid, heat-hardenable or room temperature-cured plastic and are collected together to form an elongated strand. The strand is wound into a helical groove formed in a segmental, collapsible, cylindrical metal mandrel, and length portions of the strand are also placed in circumferentially spaced, longitudinally extending grooves in the mandrel, the winding and placing continuing until the helical and longitudinal grooves are substantially filled. The plastic material is then cured and the mandrel is collapsed and removed from the interior of the resulting apertured tube.

The present invention is an improvement on the method described and illustrated in the aforesaid U.S. Pat. No. 3,692,607 which is incorporated in the present specification by reference.

SUMMARY OF THE INVENTION

In its broader aspects, the invention provides a method of fabricating an apertured tube comprising the steps of first placing an elongated coiled strip on a mandrel and forming slots in the strip, then filling the slots with glass strand material pre-wetted with heat-hardenable plastic material and surrounding the strip and filled slots with further such strand material, hardening the plastic material thereby to form a glass-reinforced plastic tube having the strip embedded therein, removing the tube and embedded strip from the mandrel, and finally removing the strip from the interior of the tube.

It is accordingly an object of the invention to provide an improved method of fabricating an apertured tube.

Another object of the invention is to provide an improved method of fabricating an apertured tube formed of reinforced plastic material.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a side elevation of one form of an elongated plastic strip used in performing the method of the invention;

FIG. 2 is a cross-sectional view taken generally along the section line 2—2 of FIG. 1;

FIG. 3 is a side view showing of the elongated plastic strip upon a mandrel and also showing the longitudinally extending slot formed in the upstanding portion of the strips;

FIG. 5 is a fragmentary cross-sectional view taken generally along the section line 5—5 of FIG. 4;

DESCRIPTION OF THE PREFERRED EMBODIMENT

Figure 4:
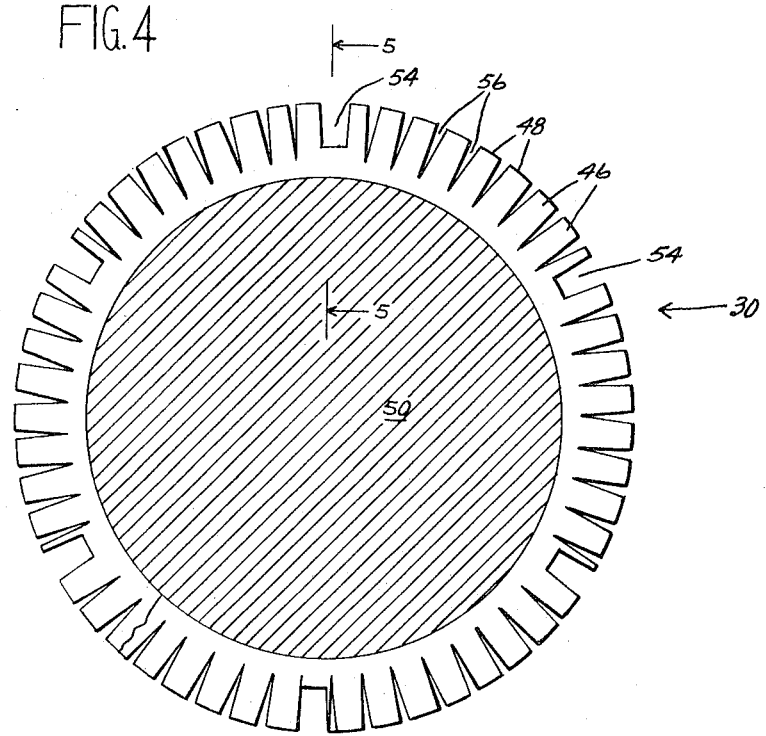
FIG. 4 is a cross-sectional view taken generally along the section line 4—4 of FIG. 3.

Referring now to FIGS. 1 and 2, there is shown an elongated strip 30 formed of material which will not bond to the heat-hardenable plastic material of which the resulting tube is formed. Strip 30 is preferably formed of extruded plastic material such as ultra-high density polyethylene or polytetrafluoroethylene. Strip 30 has a base portion 32 having upright side edges 34 and a flat bottom surface 36. Upstanding portion 38 extends upwardly from base portion 32 and in the illustrated embodiment comprises a pair of relatively narrow flanges 40 defining slot 42 therebetween. Spaced transverse cuts 44 are made in flanges 40 which form upstanding portion 38 thereby defining segments 46 respectively having upper ends or edges 48 parallel to bottom surface 36.

Referring now to FIGS. 3, 4, and 5, strip 30 is wrapped or wound spirally or helically around a lubricated, cylindrical metal mandrel 50 with bottom surface 36 of base portion 32 engaging the outer surface thereof and with side edges 34 abutting so that upstanding portion 38 forms helical groove 52. After completion of the wrapping or winding operation, circumferentially spaced, longitudinally extending grooves 54 are cut or otherwise formed in upstanding portions 38. Referring particularly to FIG. 4, it will be seen that following winding of strip 30 on mandrel 50, ends 48 of segments 46 of upstanding portion 38 are circumferentially spaced-apart to define outwardly-facing V-shaped grooves 56 therebetween, there being a plurality of segments 46 between each longitudinally extending groove 54.

Figure 6:
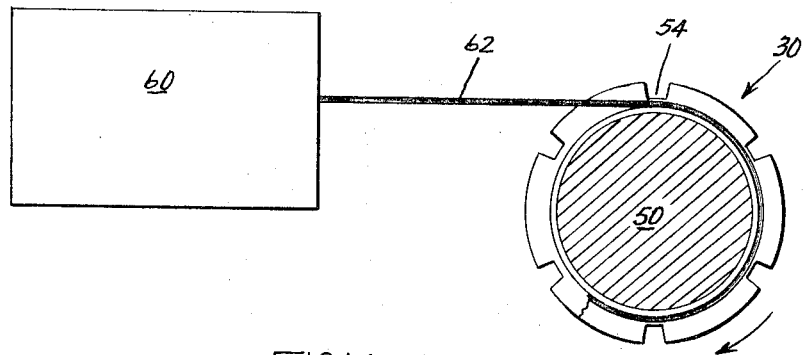
FIG. 6 is a cross-sectional view showing the winding of glass-fiber strands in the form of roving pre-wetted with heat-hardenable plastic material in the helical groove formed by the wound strip of the previous figures.

Referring now to FIG. 6, apparatus schematically indicated at 60 provides elongated, multi-filament glass strand or roving 62 pre-wetted with liquid heat-hardenable plastic material such as polyester resin. Apparatus 60 and the formation of strand 62 is completely described and illustrated in connection with FIG. 1 of the afore-mentioned U.S. Pat. No. 3,692,607 and does not, per se, form a part of the present invention.

Figure 7:
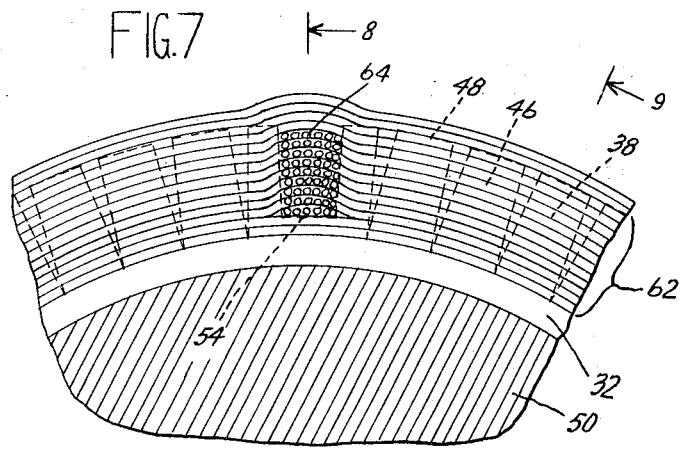
FIG. 7 is a fragmentary cross-sectional view showing the pre-wetted glass-fiber strand wound in the helical groove formed by the plastic strip and the lengths of pre-wetted glass-fiber strand placed in one of the longitudinally extending grooves formed in the upstanding portion of the strip.
Figure 8:
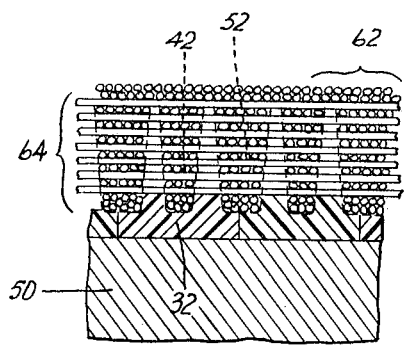
FIG. 8 is a fragmentary cross-sectional view taken generally along the section line 8—8 of FIG. 7.

Referring additionally to FIGS. 7 and 8, pre-wetted strand 62 is initially wound in helical groove 52 and helical slot 42 of upstanding portion 38 of strip 30 filling the same to the level of the bottom of longitudinal slots 54. Lengths 64 of the pre-wetted glass strand are then placed in longitudinal slots 54, and the helical winding of strand 62 and placing of strands 64 in groove 54 continues, alternately, until groove 42, and slots 52, 54 are completely filled with the pre-wetted glass strand material. Winding of strand 62 then continues until upper ends 48 of segments 46 and the longitudinally extending strands 64 in groove 54 are completely covered by a layer of strand 62.

Figure 9:
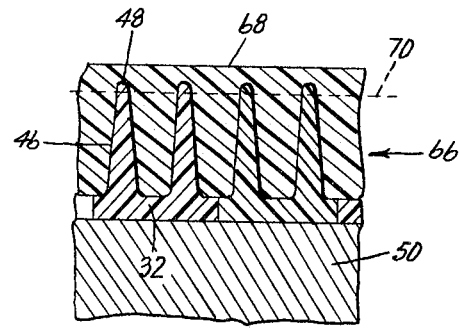
FIG. 9 is a fragmentary cross-sectional view after the heat-hardenable plastic material has been hardened, taken generally along the section line 9—9 of FIG. 7.

The resulting assembly is then cured for a length of time dictated by the particular resin employed in the heat-hardenable plastic material thereby to form hardened, glass-fiber reinforced plastic tube 60 surrounding base portions 32 of strip 30 and having segments 46 of flanges 40 embedded therein, as shown in FIG. 9.

Figure 10:
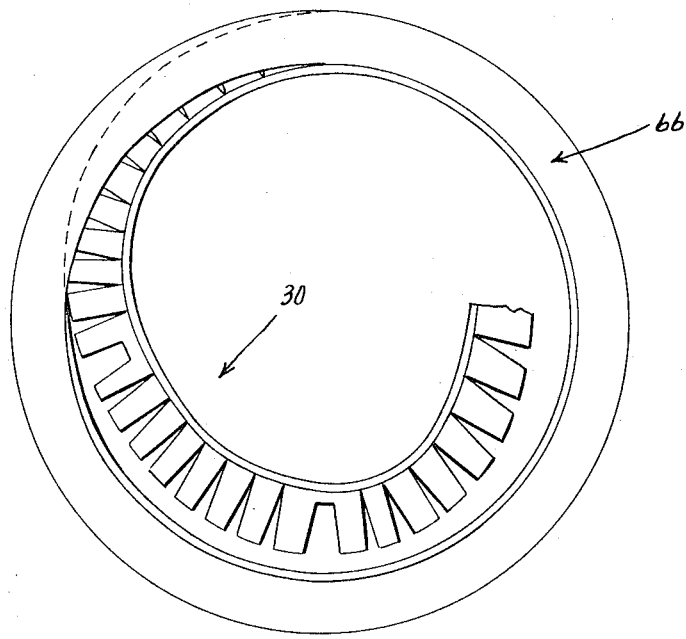
FIG. 10 is an end view showing removal of the elongated plastic strip from the interior of the resulting glass-fiber reinforced plastic tube.

Outer surface 68 of tube 66 is then ground to a radial depth indicated by dashed line 70 in FIG. 9 thereby exposing outer ends 48 of segments 46 of strip 30. Mandrel 50 is then removed from the interior of base portion 32 of strip 30 following which, strip 30 is stripped from the interior of tube 66, as shown in FIG. 10 by pulling it radially inwardly from the hardened plastic tube. Separation of the strip 30 from the plastic tube 66 is assured by reason of the non-adhering or non-bonding characteristics of the plastic in the tube 66 with the plastic of the strip 30. Also the strip 30 is flexible such that one end thereof may be separated radially inwardly of the tube 66 and this separation continued progressively for the entire helical length of the strip 30.

If desired to facilitate stripping of the strip 30, the segments 46 (FIG. 1) may be slightly tapered in width with the narrowest dimension being at edges 48 and the widest at base 32. As noted in FIGS. 2 and 9, the thickness of the flanges 40 is tapered thereby further facilitating the stripping step.

Figure 14:
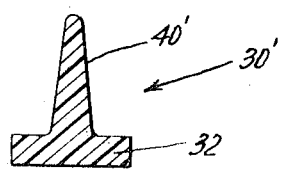
FIG. 14 is a fragmentary cross-sectional view showing another form of elongated plastic strip.

The strip 30 as wound on the mandrel 50 constitutes a plastic sleeve having flexible portions that may be separated physically from the tube 66 by flexing these portions radially inwardly. The sleeve may be formed of differently structured strips 30 and 30' as shown in FIGS. 2 and 14, and further may be integrally molded in a single piece (not shown) sufficiently flexible to be drawn inwardly away from tube 66. This integral sleeve may also be provided with a longitudinal cut thereby providing adjacent ends which may be flexed inwardly to strip the sleeve from the tube 66.

Figure 11:
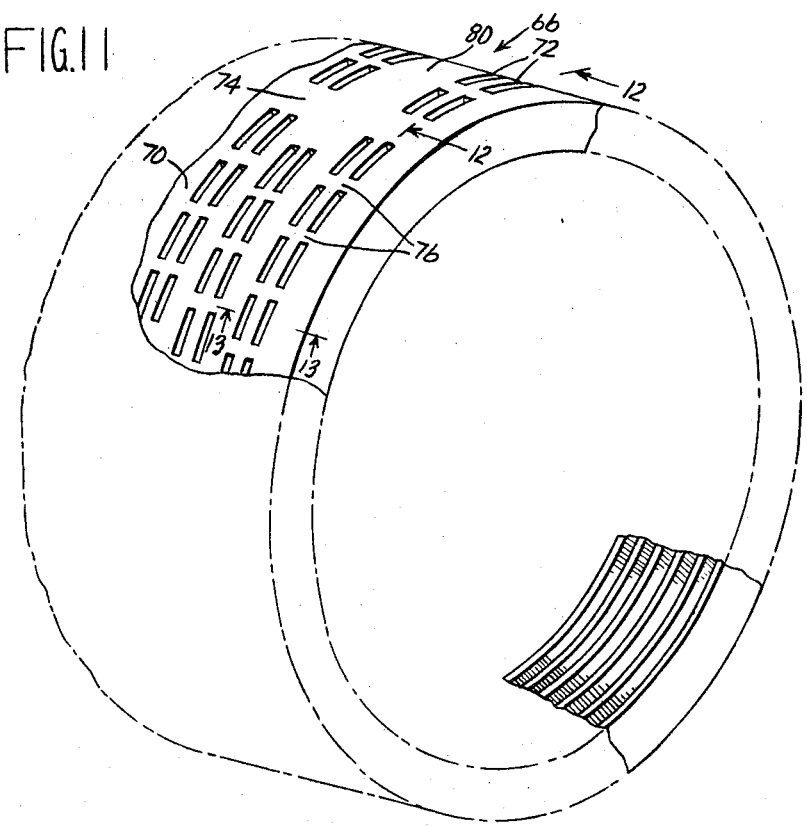
FIG. 11 is a perspective view showing a segment of the finished apertured tube.
Figure 12:
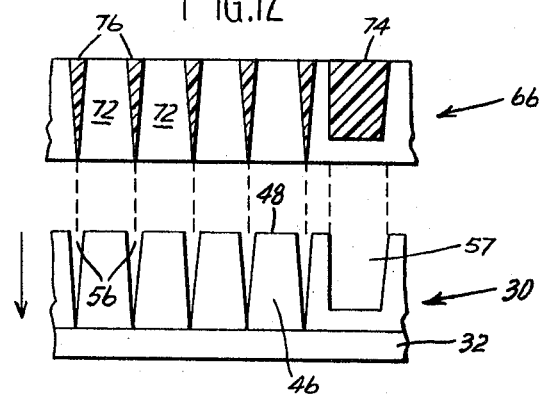
FIG. 12 is a fragmentary cross-sectional view taken generally along the section line 12—12 of FIG. 11 showing formation of the apertures by removal of the elongated plastic strip.
Figure 13:
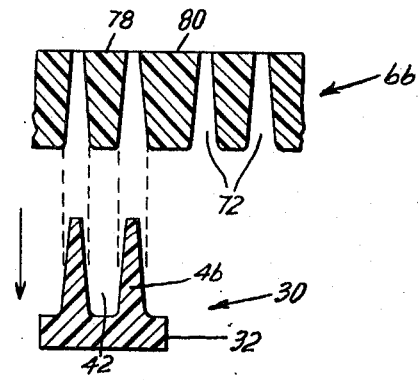
FIG. 13 is a fragmentary cross-sectional view taken generally along the section line 13—13 of FIG. 11.

Referring now to FIGS. 11, 12 and 13, it will be seen that apertures 72 in the completed tube 66 are circumferentially spaced by longitudinally extending bars 74 formed by grooves 54 in strip 30, ribs 76 formed by V-grooves 56 in strip 30, and by annular ribs 78, 80 respectively formed by slot 42 in strip 30 and by annular groove 52. Formation of apertures 72, bars 74, and ribs 76, 78, 80 by removal of strip 30 from the interior of tube 66, is shown in FIGS. 12 and 13.

Referring now briefly to FIG. 14, strip 30' may have a single upstanding flange 40' rather than the pair of flanges 40 as shown in the previous figures.

It will be understood that certain variations in the method described above are within the scope of the invention. For example, depending upon the material from which strip 30 is formed, V-shaped notches 56 may be formed after strip 30 is wound or otherwise positioned on mandrel 50 and/or groove 54 may be formed prior to winding or otherwise positioning strip 30 on mandrel 50. Further, strip 30, with or without cuts 46 and grooves 54 may be precoiled and then assembled on mandrel 50 rather than being wound or wrapped thereon. In the event that a smaller number of larger apertures 72 is desired, cuts 44 and the resulting V-shaped notches 56 in strip 30 may be eliminated entirely leaving longitudinal grooves 54 to form longitudinal bars 74 in the resulting tube.

It will be understood that the depth of the grinding operation to form outer surface 70 of tube 66 determines the size of apertures 72, i.e., the deeper the grind the larger the apertures. While grinding outer surface 68 of tube 66 to form surface 70 with tube 66 still positioned on mandrel 50 has been described, it will be readily understood that the grinding operation may be performed after removal of tube 66 from mandrel 50 and removal of strip 30 from tube 66.

While alternate winding of strand 62 in slot 42 and groove 52, and placing strand lengths 64 in longitudinal grooves 54 is described above, it will be understood that the strand lengths 64 in grooves 54 may comprise a single bundle of such strand lengths or a plurality of such bundles. Still further, winding of strand 62 may be eliminated with grooves 54 being filled with strand lengths 64 and strip 30 then covered with an open weave of pre-wetted glass-fiber cloth formed by braiding, weaving or filament winding techniques.

While there have been described above the principles of this invention in connection with specific apparatus, it is to be clearly understood that this description is made only by way of example and not as a limitation to the scope of the invention.

What is claimed is:

1. The method of fabricating an apertured tube comprising the steps of:
   a. providing an elongated flexible strip proportioned and arranged to be wound on a mandrel, said strip having a base portion with an upstanding portion extending therefrom,
   b. winding said strip on a mandrel with said base portion in engagement therewith and said upstanding portion forming a generally helical groove,
   c. forming circumferentially spaced, longitudinally extending grooves in said upstanding portion of the thus-wound strip,
   d. winding multi-filament glass strands pre-wetted with hardenable plastic material in said helical groove and placing lengths of such strand in said longitudinal grooves so as substantially to fill said helical and longitudinal grooves,
   e. hardening said plastic material while said strands and lengths are in said grooves and said strip is on said mandrel thereby to form a glass-fiber reinforced plastic tube surrounding said base portion of said strip and with said upstanding portion embedded in the wall of said tube, f. removing said mandrel from the interior of said base portion of the wound strip, and g. removing said strip from the interior of said tube, removal of said upstanding portion from the wall of said tube leaving apertures therein.

2. The method of claim 1 wherein said strip is formed of material which will not bond to said plastic material.

3. The method of claim 2 wherein said step (a) includes making transverse radial cuts in said upstanding portion of said strip at spaced intervals thereby to divide the same into segments each having an outer end, said segment ends being circumferentially spaced-apart following said winding step (b).

4. The method of claim 3 wherein said winding and placing step (d) includes winding said strands to a depth completely to cover said segment ends, and comprising the further step (h) following said hardening step (e) and prior to said mandrel removing step (f) of removing material from the outer surface of said tube at least to a depth to expose the space formed by said segment ends whereby said apertures extend through the wall of said tube upon completion of said strip removing step (g).

5. The method of claim 4 wherein said mandrel is cylindrical whereby said tube is cylindrical, said material removing step (h) comprising grinding said outer surface of said tube.

6. The method of claim 1 wherein said upstanding portion of said strip comprises a pair of relatively narrow, upstanding flanges defining a slot therebetween, said winding and placing step (d) including winding said strands in said slot.

7. The method of claim 1 wherein said base portion of said strip has side edges which are abutting following said strip winding step (b).

8. The method of claim 1 wherein said winding and placing steps (d) are alternately performed.

9. The method of claim 1 wherein said strip is formed of extruded plastic material which will not bond to said hardenable plastic material, said first step (a) including making transverse cuts in said upstanding portion of said strip at spaced intervals thereby to divide the same into segments each having an outer end, said segment ends being circumferentially spaced-apart following said winding step (b), said mandrel being cylindrical whereby said tube is cylindrical, said base portion of said strip having side edges which are abutting following said strip winding step (b), said winding and placing step (d) including winding said strands to a depth completely to cover said segment ends, and comprising the further step (h) following said hardening step (e) and prior to said mandrel removing step (f) of grinding the outer surface of said tube to remove material therefrom at least to a depth to expose said segment ends whereby said apertures extend through the wall of said tube upon completion of said strip removing step (g).

10. The method of fabricating an apertured tube comprising the steps of:

a. in any order, placing an elongated coiled strip on a mandrel, and forming slots in said strip, b. filling said slots with glass-fiber strand material and surrounding said strip and filled slots with further such strand material, c. impregnating said strand material with hardenable plastic material, d. hardening said plastic material thereby to form a glass-reinforced plastic tube having said strip embedded therein, e. removing said tube and embedded strip from said mandrel, and f. removing said strip from the interior of said tube.

11. The method of fabricating an apertured tube comprising the steps of:

a. forming a hollow sleeve of plastic material having a plurality of peripherally exposed slots therein and separable flexible portions which may be flexed inwardly, b. placing glass-fiber material in said slots, c. impregnating said glass-fiber material with hardenable plastic of a composition that does not bond to the plastic material of said sleeve, d. hardening said hardenable plastic, and e. physically removing said plastic sleeve from said hardened plastic by flexing said separable portions radially inwardly thereof.

* * * * *